Feb. 5, 1946.   H. O. SCHJOLIN   2,394,405
TWO STAGE PROPELLER SHAFT
Filed Feb. 24, 1944    3 Sheets-Sheet 1

Inventor
Hans O. Schjolin
By Blackmor, Spencer & Hunt
Attorneys

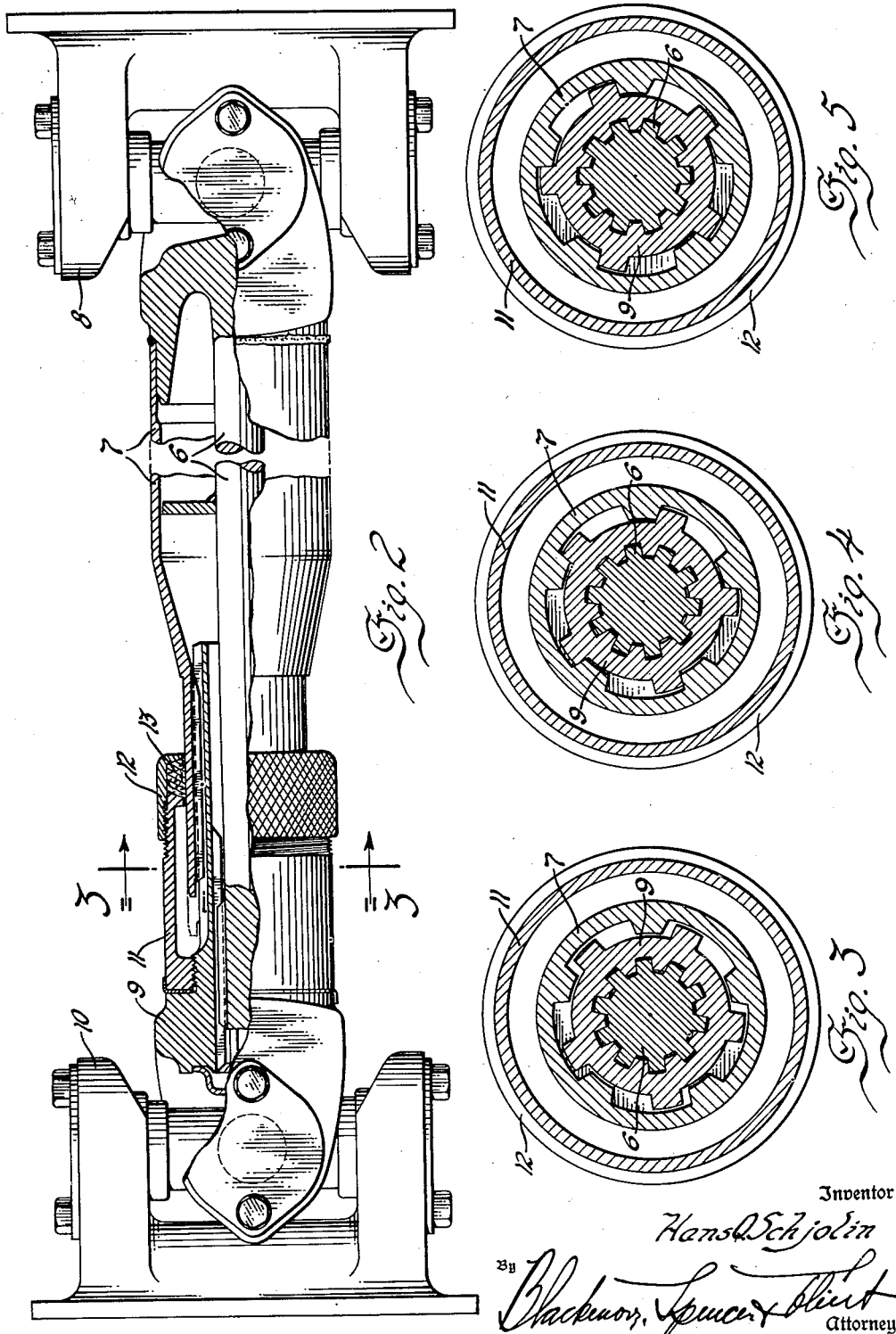

Feb. 5, 1946. H. O. SCHJOLIN 2,394,405
TWO STAGE PROPELLER SHAFT
Filed Feb. 24, 1944 3 Sheets-Sheet 3
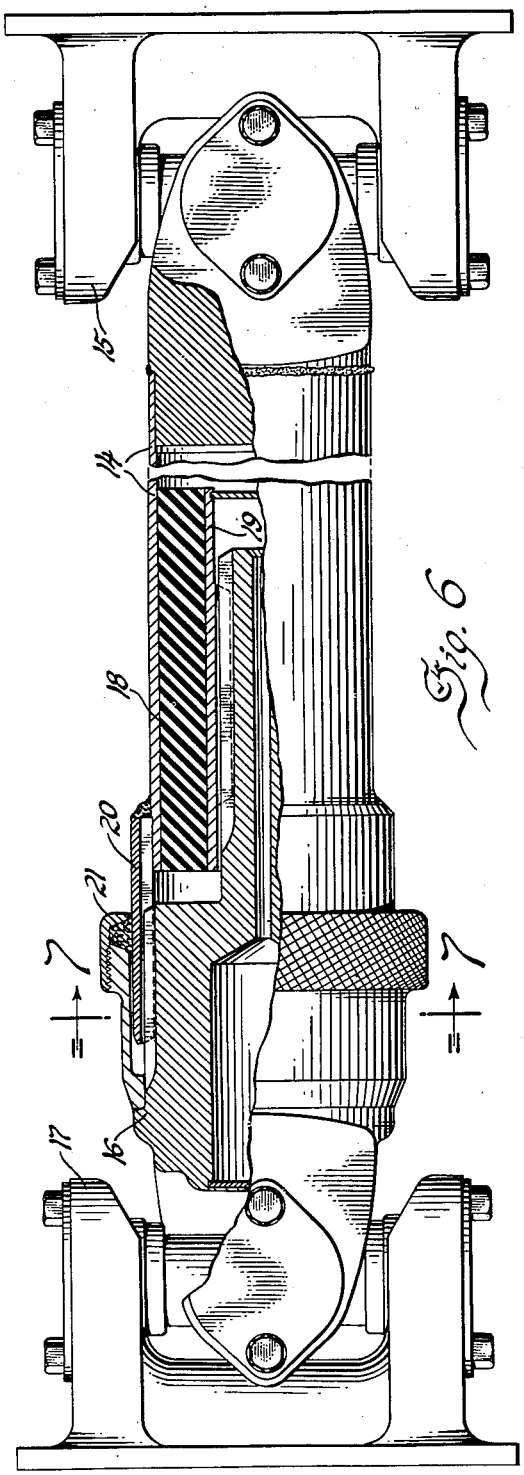
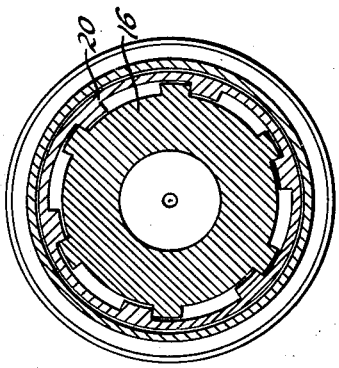
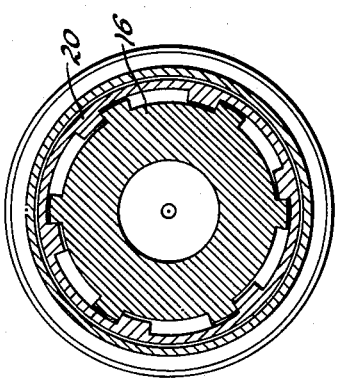
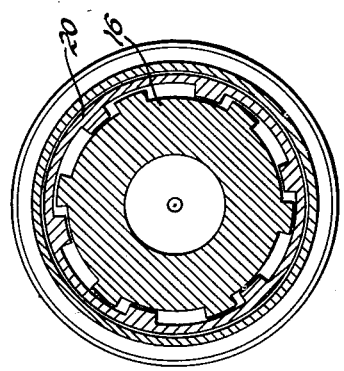
Inventor
Hans O. Schjolin
By Blackmore, Spencer & Flint
Attorneys Patented Feb. 5, 1946

2,394,405

UNITED STATES PATENT OFFICE 2,394,405

TWO STAGE PROPELLER SHAFT

Hans O. Schjolin, Birmingham, Mich., assignor to General Motors Corporation, Detroit, Mich., a corporation of Delaware Application February 24, 1944, Serial No. 523,653

6 Claims. (Cl. 74—189.5)

Ordinarily a propeller shaft is designed ruggedly with reference to the heaviest load to be transmitted. In many installations, overstiffness is objectionable because shock as well as torque loads are transmitted, and some shaft elasticity is wanted to cushion shock. On the other hand, too much resiliency results in erratic torque transmission and severe reactions, and tends toward weakness and breakage. The propeller shaft is easily adapted for conveniently inserting flexibility in the power transmitting train to relieve other parts from strain. Design considerations are without serious problems where substantially constant speed and uniform loading are involved, but they become complex where operation proceeds under varying forces. An example of the latter type of operation is a propeller drive shaft installation in a city service passenger bus which operates with frequent stops at passenger stations, and in heavy traffic, so that load on the propeller shaft varies almost constantly.

Passenger coaches of a well known advanced type incorporate a power transmission referred to as a hydraulic torque converter. An embodiment is illustrated in my U. S. Patent 2,322,479. Torque converter transmission assemblies, as ordinarily built, afford fluid drive from the engine for the first stage of vehicle travel, which is low speed under heavy load, and a second stage in high or direct speed setting for drive from the engine under lighter load. There is, of course, an additional low gear or reverse setting for infrequent backward vehicle travel which generally is heavy load power transmission. Reverse setting and the two forward stages need to be accommodated in propeller shaft design, but since motor coach travel is almost exclusively forward, critical attention to the elimination of shock in the two forward stages only is essential.

A conventional propeller shaft selected by dictation of first stage load will be substantially resistant to torsional deflection under second stage load and without flexibility available for cushioning shock in direct drive. However, in a torque converter installation, second stage flexibility in the propeller shaft is of more consequence because the engine then is coupled solidly with the drive wheels, whereas in the first stage the coupling is through the fluid drive mechanism which by its very nature avoids uneven impulses and smooths out disturbances. Consequently, in the first stage the need for propeller shaft resiliency is absent, but in the lighter load second stage definitely is present. In other words, the ordinary propeller shaft is a natural spring torque bar, but only serves as such in low gear. It is built to carry the highest transmission output torque, usually several times engine torque, in addition to shock loads. Only under heavy torque does the shaft deflect sufficiently to provide a cushion. Under light loads, as in high gear, the shaft deflects very little, and for practical purposes constitutes a rigid drive at a time when flexibility and vibration absorption qualities are mostly needed. Furthermore, direct drive or high gear is used most of the time and engine noises are then less and vibration and rumble more noticeable.

As above indicated, the shortcomings of conventional propeller shaft constructions are particularly obvious in connection with hydraulic transmission wherein no mechanical cushion or shock deflection is needed under heavy torque, since the hydraulic system provides all the smoothness and flexibility that can be desired. However, flexibility is badly needed in direct drive but then the shaft is rigid since it is designed to carry as much as five times direct drive engine torque. In some coaches rumble and vibration are very objectionable in direct drive, partially because of contrast to the perfect smoothness in hydraulic.

It is an object of the present invention to provide a two-stage propeller shaft which has torsional elasticity within a given limit of deflection as determined by the loading in direct drive whereby to cushion shock in one stage and relieve the parts from excessive loading beyond the deflection limit as would occur normally in the other stage when the drive is through the fluid mechanism which itself eliminates shocks.

A further object is to provide a structure which operates in either stage automatically in accordance with the load imparted therethrough and which maintains the elastic member preloaded and against unloading even when direction of drive therethrough is reversed. It should be noted that the preloading is beneficial in that the low torque member can only be flexed and stressed in one direction and that this is an important factor in fatigue and life expectancy.

Other objects and advantages will become apparent in the course of the following specification having reference to the accompanying drawings wherein:

Figure 2 is an enlarged view partly in section of one type of propeller shaft embodying the present improvement.

Figure 1:
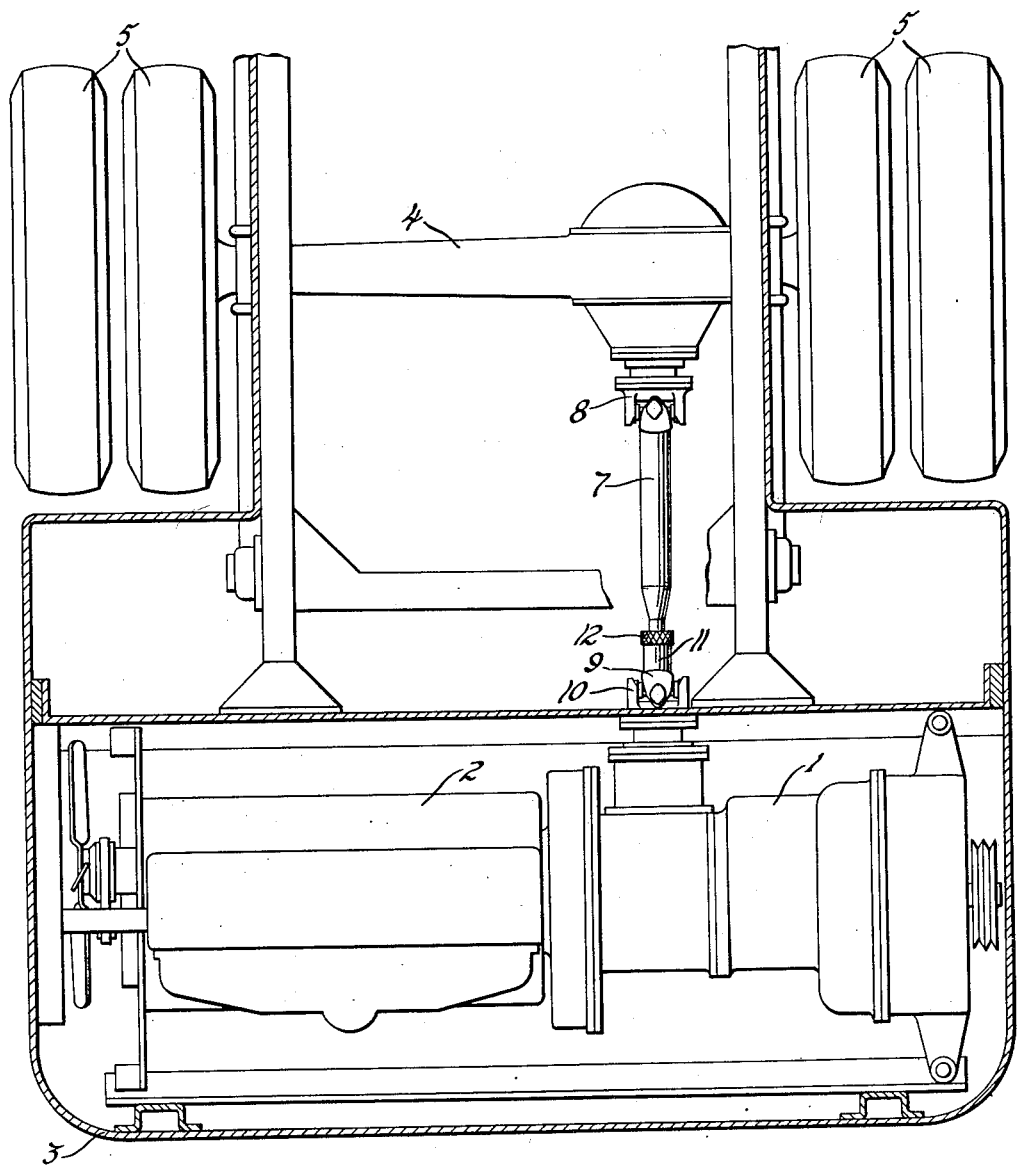
Figure 1 is a top plan view showing a motor coach drive mechanism.

Figures 3, 4, and 5 are sections taken on line 3—3 of Figure 2 with the parts in different relative positions.

Figure 6 shows another form of propeller shaft with parts broken away, and

Figures 7, 8, and 9 are transverse sections illustrating different relations of the parts as viewed on line 7—7 of Figure 6.

Referring to the drawings, the torque converter transmission assembly 1 is shown as a unit with the engine 2 transversely mounted at the rear of the coach framing 3. The body frame 3 is spring supported on a drive axle 4 having road wheels 5 and enclosing a differential mechanism to be drive connected with the output and with the power plant assembly by a short length propeller shaft assembly containing universal joints and a slip drive connection to accommodate spring deflection between the axle and frame.

The propeller shaft assembly shown in Figure 2 includes a solid shaft 6 within a hollow tubular shaft 7, both fixedly connected to the universal joint 8 at the axle end of the assembly and both slidably splined at the other end on a tubular coupling shaft member 9 of the universal joint 10 at the engine output connection. To provide a slip joint, the power transmitting shaft 9, axially aligned with the inner and outer shaft members 6 and 7, has its end portion fitted and in concentric nested relation with the adjacent end portions of the shafts 6 and 7, and carries internal and external spline formations axially slidably fitted to mating spline formations on the periphery of the inner shaft 6 and on the interior of the outer shaft 7. As a seal for the joint a surrounding sleeve 11 carried by the coupling member 9 and in cooperation with a retainer cap 12 threaded thereon, locates a packing ring 13 for a tight sliding fit on the tubular shaft 7.

Referring more particularly to Figures 3, 4, and 5, it will be noted that the external axially extending ribs on the spline projections of the shaft 6 closely interfit with the internal spline projections of the shaft 9 so that these parts are substantially free from lost motion. On the other hand, the splineways between the external ribs of the shaft 9 and the internal ribs of the shaft 7 are considerably wider than the width of the ribs located therein so as to enable a limited lost motion travel between the shafts. By reason of the sloppy or loose fit, each rib on one shaft can move circumferentially between the limit stops provided between spaced neighboring ribs on the other shaft. Thus, by comparison of Figure 4, showing the relation of parts with the mating ribs at one limit, with Figure 5, showing the relation of the same parts at the opposite limit, it will be noted that each projection on one shaft contacts at opposite limits through its opposite side faces respectively with the spaced ribs defining the splineway on the other shaft. Figure 3 illustrates the relation of parts with the mating projections on the shafts 7 and 9 in an intermediate range of relative travel and out of driving contact.

With this arrangement the inner shaft 6 may be made more elastic to torsional deflection than the outer shaft 7. The design of the outer shaft 7 can be such as to approximate the stiffness of the conventional propeller shaft since normally it comes into action only in the transmission of high torque loads and after the shaft 6 has been wound up sufficiently that the lost motion in the splined connection is taken up. The design of the inner shaft 6, as to torsional flexibility, can be controlled entirely by the ordinary torque loading in high gear. In order, however, that this flexible shaft will be flexed and stressed only in one direction and not be permitted to unload to zero deflection nor to be stressed in the opposite direction, the parts are initially assembled with the flexible shaft under given preload. Thus, assuming that forward drive rotation is counterclockwise in Figures 3, 4, and 5, the lost motion parts are illustrated in Figure 5 in contact in what may be termed the no-drive relation. This dead end contact of the spline formations between the outer shaft 7 and the intermediately nested shaft 9, and the closely fitted splined connection with the central shaft 6 along with the rigid connection between the opposite ends of the shafts 6 and 7, establishes the stiff shaft 7 as a stop against unwinding of that portion of the shaft 6 intermediate its opposite ends. The relation will be maintained also when the flow of power from the engine to the road wheels is in the reverse direction of rotation for backward vehicle travel and in the vehicle coast-forward, with or without braking action at the engine end of the propeller shaft.

In the forward drive the flexible shaft 6 is capable of carrying engine torque only, and its torsional deflection carries the complementary spline projections on the shafts 7 and 9 through the wide splineways as illustrated in Figure 3, for example, and enable shock and vibration to be cushioned. However, when engine torque is exceeded, as when the drive is through the ordinary low speed gears or a fluid drive mechanism, the shaft 6 reaches its maximum windup and the parts come into the relation shown in Figure 4 so that the increased torque is transmitted through the stiffer shaft 7 and relieves the flexible shaft from excess loading.

In place of the elastic torsion bar shaft heretofore described, there may be substituted other types of low torque transmitting devices such, for example, as a non-metallic deformable motion transmitting part. One such embodiment is illustrated in Figure 6 wherein a substantially rigid tubular propeller shaft 14 is connected at one end to a universal joint 15 and is telescopically fitted at its opposite end to an axially aligned shaft 16 connected with the universal joint 17. Between the interfitting shaft ends is interposed a bushing or sleeve 18 of rubber or the like which preferably is bonded by vulcanization exteriorly to the end portion of the tubular shaft 14 and interiorly to a metal sleeve 19 which has a sliding spline close fit on the reduced end of the shaft 16. On the larger diameter portion of the shaft 16 there is formed a second set of external splines loosely fitted to interior splines on an extension 20 which is secured as by welding to the stiff shaft 14 and peripherally engaged by a sealing ring 21. By reason of the clearance in the loosely fitted splined connection between the shafts, engine torque in direct drive will be transmitted by the closely fitted spline connection through the rubber sleeve 18 within the range of the loosely fitted spline keys indicated in Figures 7, 8, and 9. Here again the elastic load transmitting element is preloaded in the forward counterclockwise direction by initially fitting the parts in the relation illustrated in Figure 9 which is the position of coasting, no-drive, and reverse. In the first stage as seen in Figure 8, when drive is transmitted in hydraulic or low gear, the shaft 16, after deflecting the bushing 18, has turned to its limit in which its splined keys abut and pick up the driving keys on the rigid shaft. Under the lighter and second stage torque delivery in high or direct gear setting, the load will be transmitted entirely through the rubber bushing with the loosely fitted keys assuming relative positions somewhat in the manner shown in Figure 7. The low torque member cannot under any condition be shock loaded above its maximum operating stress. Driving shock throughout the entire drive train is eliminated, and not only the propeller shaft itself but also the associated gears, axle shafts and the like will operate with long life and more quietly. The design is such that changes between first and second stages are taken care of automatically in accordance with the torque transmitted and the response of the elastic member within the range of relative travel afforded by the clearance or space in the splineways for the cooperating spline keys.

I claim:

1. In the transmission of power, a change speed mechanism including a fluid drive affording a low speed heavy load stage and a solid drive affording a high speed light load stage, a two-stage propeller shaft for use therewith, comprising a relatively stiff shaft portion capable of withstanding heavy load in the stage in which the fluid drive is effective in cushioning shock, a relatively resilient shaft for transmitting power and cushioning shock in solid drive stage, and a power transmitting member drivingly connected to both of said shafts, the connection to the resilient shaft being free of lost motion and the connection to the stiff shaft embodying lost motion sufficient to enable light load to be carried entirely by the resilient shaft and to be taken up upon predetermined torsional deflection of the resilient shaft as the load increases for additional load transmission through the stiff shaft.

2. In combination with an engine driven change speed transmission having a fluid drive high torque stage and a solid drive low torque stage and mechanism to be driven therefrom, of relatively flexible drive transmitting means operatively connecting said mechanism and the transmission for transmitting drive therebetween in the solid drive low torque stage and serving to cushion impulses by reason of its flexibility and relatively stiff means operatively connecting said mechanism and the transmission and having a limited lost motion connection therein arranged to preload the flexible means and restrain its deflection by taking over transmission of driving in the fluid drive high torque stage.

3. In a motor drive, an engine driven change speed mechanism having a fluid drive high torque stage and a solid drive low torque stage, a propeller shaft unit comprising an input driven end member drive connected with the change speed mechanism to transmit drive in both stages, a drive shaft telescopically fitted to said driven end member, a body of elastic deformable material interposed between the end member and said shaft for the transmission of drive therebetween in the solid drive low torque stage of the change speed mechanism and interengageable abutments on the shaft and the end member to place said body under preload in the forward drive direction and to permit limited circumferential deformation thereof in said forward drive direction, for cushioning of load in solid drive and said abutments under predetermined increased load affording solid drive from one to the other in the fluid cushioned high torque stage of the change speed mechanism.

4. In a motor drive, an engine driven change speed mechanism having a fluid drive high torque stage and a solid drive low torque stage, a propeller shaft comprising an input driven end member drive connected with the change speed mechanism to transmit drive in both stages, an output drive member, a substantially stiff transmitting element connected thereto and telescopically fitted to and splined on said end member for limited free circumferential movement and a relatively resilient element operatively connecting the driven and driving members and being maintained under preload through the splined connection of said stiff element with said input end member, said resilient element being arranged to transmit and cushion drive in the solid low torque stage of said change speed mechanism and to yield under the load of the high torque stage operation of said change speed mechanism to the limit of free circumferential movement of said stiff transmitting element, which latter then transmits the drive in the fluid cushioned high torque stage.

5. In a motor drive, an engine driven change speed mechanism having a fluid drive high torque stage whose action is such as to damp and eliminate transmission of impulses therethrough and a solid drive low torque stage having no impulse damping characteristic, a propeller shaft unit comprising a driven end member drive connected with the change speed mechanism for the transmission of drive in both stages, a pair of shafts one of which is relatively stiff for action in the high torque stage and the other of which is relatively torsionally elastic for action in the low torque stage, means rigidly interconnecting the shafts at their driving ends, splined connections between the said driven end member and the driven ends of both shafts, the splined connection with the flexible shaft being relatively free of lost motion circumferentially for drive in both stages and the splined connection with the stiff shaft having limited circumferential lost motion only in the direction of forward drive for drive under high torque load and being so related to the flexible shaft splined connection as to maintain the flexible shaft under torsional preload in the forward drive direction.

6. In combination with an engine driven change speed transmission having a fluid drive high torque stage and a solid drive low torque stage and mechanism to be driven therefrom of a torque transmitting connection between the transmission and the mechanism having automatic response to torque load for affording solid drive in the high torque fluid cushioned drive stage and a cushioned drive in the solid drive low torque stage and including a pair of axially alined shafts having their adjacent ends nested one within another, a metal sleeve interposed between said nested ends, a close fit sliding spline connection between the sleeve and one shaft, a torque transmitting rubber bushing connection between the sleeve and the other shaft and a sliding spline connection between said shafts comprising a relatively wide splineway and a relatively narrow key engageable with one side of the splineway to preload said rubber bushing torsionally and with the opposite side of the splineway to relieve the bushing from increased torsional loading above a predetermined amount.

HANS O. SCHJOLIN.